US010812390B2

(12) United States Patent
Rutkowski et al.

(10) Patent No.: US 10,812,390 B2
(45) Date of Patent: Oct. 20, 2020

(54) INTELLIGENT LOAD SHEDDING OF TRAFFIC BASED ON CURRENT LOAD STATE OF TARGET CAPACITY

(71) Applicant: Microsoft Technology Licensing, LLC, Redmond, WA (US)

(72) Inventors: Bradley Rutkowski, Woodinville, WA (US); Saraswathy Srinivasan, Sammamish, WA (US); Gregory Thiel, Black Diamond, WA (US); Kushal Suresh Narkhede, Redmond, WA (US); Mathrubootham Janakiraman, Redmond, WA (US); Rajesh Maskara, Redmond, WA (US); Todd Luttinen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 110 days.

(21) Appl. No.: 15/871,813

(22) Filed: Jan. 15, 2018

(65) Prior Publication Data

US 2019/0097933 A1 Mar. 28, 2019

Related U.S. Application Data

(60) Provisional application No. 62/562,051, filed on Sep. 22, 2017.

(51) Int. Cl.
*H04L 12/28* (2006.01)
*H04L 12/803* (2013.01)
(Continued)

(52) U.S. Cl.
CPC ........ *H04L 47/125* (2013.01); *H04L 41/0896* (2013.01); *H04L 41/12* (2013.01);
(Continued)

(58) Field of Classification Search
None
See application file for complete search history.

(56) References Cited

U.S. PATENT DOCUMENTS 6,513,061 B1 1/2003 Ebata et al.
7,376,080 B1 5/2008 Riddle et al.
(Continued)

FOREIGN PATENT DOCUMENTS

WO 0239699 A1 5/2003

OTHER PUBLICATIONS

"Configuring GSLB for Proximity", Retrieved From <<http://docs.citrix.com/en-us/netscaler/11-1/gslb/configure-gslb-proximity.html>>, May 19, 2016, 3 Pages.
(Continued)

*Primary Examiner* — Kwang B Yao
*Assistant Examiner* — Juvena W Loo

(57) ABSTRACT

Various embodiments of the present technology generally relate to systems and methods for intelligent load shedding. More specifically, various embodiments of the present technology generally relate to intelligent load shedding of traffic based on current load state of target capacity. In some embodiments, a domain name resolution request to translate a domain name into an Internet protocol (IP) address can be received at DNS server. A status of each of multiple scaling units mapped to the domain name can be determined. A set of IP addresses (e.g., four IP addresses) corresponding to a subset of the multiple scaling units closest to the requesting device with statuses indicating availability for new traffic can be identified. Then, the set of IP addresses can be sent to the requesting device. The requesting device can the select which IP address to use (e.g., randomly) to route the traffic.

20 Claims, 8 Drawing Sheets

(51) Int. Cl.
*H04L 12/24* (2006.01)
*H04L 29/08* (2006.01)
*H04L 12/26* (2006.01)
*H04L 12/851* (2013.01)
*H04L 29/12* (2006.01)

(52) U.S. Cl.
CPC ...... *H04L 43/0876* (2013.01); *H04L 43/0882* (2013.01); *H04L 47/2483* (2013.01); *H04L 61/1511* (2013.01); *H04L 67/1008* (2013.01); *H04L 67/1021* (2013.01); *H04L 67/1029* (2013.01); *H04L 43/10* (2013.01); *H04L 43/16* (2013.01)

(56) References Cited

U.S. PATENT DOCUMENTS

| | | | |
|---|---|---|---|
| 7,574,508 B1* | 8/2009 | Kommula | H04L 29/12066 709/226 |
| 7,620,687 B2 | 11/2009 | Chen et al. | |
| 8,135,820 B2 | 3/2012 | Richardson et al. | |
| 8,527,639 B1* | 9/2013 | Liskov | H04L 67/1004 709/203 |
| 8,645,517 B2* | 2/2014 | Stolorz | H04L 47/20 709/223 |
| 8,892,728 B2* | 11/2014 | Susanta | G06F 9/5083 709/224 |
| 9,203,636 B2 | 12/2015 | Stolorz et al. | |
| 9,225,775 B2* | 12/2015 | Hsu | H04L 67/1008 |
| 2003/0069968 A1 | 4/2003 | O'Neil et al. | |
| 2004/0205108 A1* | 10/2004 | Tanaka | G06F 9/4881 709/201 |
| 2010/0296445 A1* | 11/2010 | Sarikaya | H04L 29/12066 370/328 |
| 2013/0297596 A1 | 11/2013 | Mouline et al. | |
| 2015/0358401 A1* | 12/2015 | Flavel | H04L 67/1095 370/235 |
| 2017/0134337 A1 | 5/2017 | Ara Jo | |
| 2017/0135068 A1* | 5/2017 | Kodaypak | H04L 47/125 |
| 2018/0019909 A1* | 1/2018 | Tanabe | H04L 65/105 |

OTHER PUBLICATIONS

Balasubramanian, et al., "Evaluating the Performance of Middleware Load Balancing Strategies", In Proceedings of Eighth IEEE International of Enterprise Distributed Object Computing Conference, Sep. 20, 2004, 13 Pages.

"Load Sharing with DNS—Helen McDevitt", Retrieved From <<http://web.archive.org/web/20040311145701/http:/ntrg.cs.tcd.ie/undergrad/4ba2.01/group8/DNS.html>>, Mar. 11, 2004, 5 Pages.

Tatbul, et al., "Staying Fit: Efficient Load Shedding Techniques for Distributed Stream Processing", In Proceedings of the 33rd International Conference on Very Large Data Bases, Sep. 23, 2007, 12 Pages.

Gulbrandsen, et al., "A DNS RR for Specifying the Location of Services (DNS SRV); rfc2782.txt", Retrieved from https://tools.ietf.org/pdf/rfc2782.pdf, Feb. 2000, 12 Pages.

"International Serach Report and Written Opinion Issued in PCT Application PCT/US2018/039198", dated Sep. 12, 2018, 12 Pages.

* cited by examiner

… (1) US 10,812,390 B2

INTELLIGENT LOAD SHEDDING OF TRAFFIC BASED ON CURRENT LOAD STATE OF TARGET CAPACITY

CROSS-REFERENCE TO RELATED APPLICATIONS

This application claims priority to U.S. Provisional Application Ser. No. 62/562,051 filed Sep. 22, 2017, which is incorporated herein by reference in its entirety for all purposes.

BACKGROUND

Modern electronic devices such as computers, tablets, mobile phones, wearable devices and the like have become a common part of modern life. Many users of electronic devices routinely utilize various types of software applications for business and personal activities. Examples of software applications can include word processors, spreadsheet applications, e-mail clients, notetaking software, presentation applications, games, computational software, and others. These software applications can also be used to perform calculations, produce charts, organize data, receive and send e-mails, communicate in real-time with others, and the like. The software applications can range from simple software to very complex software. Moreover, there are a variety of channels for delivering software and services to end-users such as cloud computing services.

Examples of popular cloud computing services include, but not limited to, software as a service (SaaS), platform as a service (PaaS), and the like. For example, SaaS is becoming a popular delivery mechanism where software applications are consumed by end-users over the internet. As a result, end-users do not have to install and run the applications locally as the applications are maintained in the cloud by the service provider. With these types of cloud computing services, the provider hosts the hardware and/or software resources that end-users can access over a network connection. These resources are hosted on various servers that can be geographically distributed around the world. Understanding how to route each particular request can be challenging especially as demand on particular servers increase.

Overall, the examples herein of some prior or related systems and their associated limitations are intended to be illustrative and not exclusive. Upon reading the following, other limitations of existing or prior systems will become apparent to those of skill in the art.

SUMMARY

Various embodiments of the present technology generally relate to systems and methods for intelligent load shedding. More specifically, various embodiments of the present technology generally relate to intelligent load shedding of traffic based on current load state of target capacity. In some embodiments, a domain name resolution request to translate a domain name into an Internet protocol (IP) address can be received at DNS server. A status of each of multiple scaling units mapped to the domain name can be determined. In some embodiments, the status can include a variety of information such as, but not limited to, indications of scaling unit health, scaling unit utilization, scaling unit capacity, scaling unit resource utilization, scaling unit processor utilization rates, scaling unit wait times, scaling unit response times, and/or scaling unit queue lengths.

A set of IP addresses (e.g., four IP addresses) corresponding to a subset of the multiple scaling units closest to the requesting device with statuses indicating availability for new traffic can be identified. Then, the set of IP addresses can be sent to the requesting device. The requesting device can then select (e.g., randomly or on scaling unit properties) which IP address to use to route the traffic.

Embodiments of the present invention also include computer-readable storage media containing sets of instructions to cause one or more processors to perform the methods, variations of the methods, and other operations described herein.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings in which.

Figure 1:
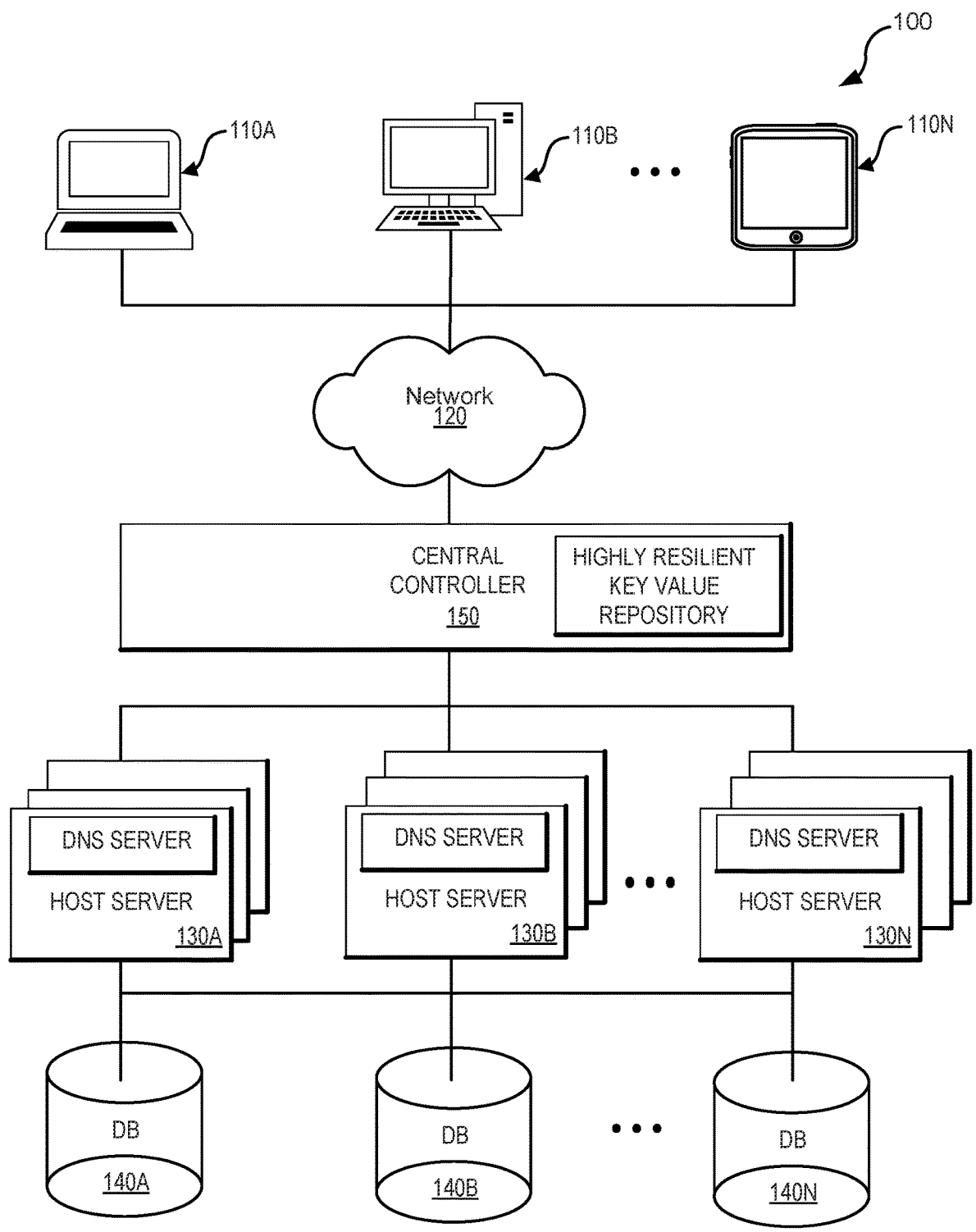
FIG. 1 illustrates an example of an environment capable of implementing an intelligent load shedding system in accordance with some embodiments of the present technology.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to systems and methods for intelligent load shedding. More specifically, various embodiments of the present technology generally relate to intelligent load shedding of traffic based on current load state of target capacity. Modern computing devices often access remote servers to access information, resources, webpages, services, and the like. In many cases, the servers may be geographically spread out depending on demand. Developing systems that efficiently serve end-user traffic with the closest front-end that has available resources to serve the request can be difficult.

Traditionally, a variety of techniques have been developed to shed load when a server is too busy or becomes unresponsive. However, these traditional techniques shed traffic without knowledge of the current resource utilization of the scaling units that it is shedding load too. In contrast, various embodiments of the present technology allow each scaling unit to publish load characteristics and/or available resources which can be used to make intelligent routing decisions so that traffic is routed or shed only to scaling units that have been identified as not constrained on resources. For example, in some embodiments, the system can shed incoming traffic based on current load state of the target capacity. The requests can be routed to location that is not identified as critically loaded (in order of preference). If the first-preferred location is identified as loaded, then the requests are routed to second-preferred location. If the second-preferred location is also identified as critically loaded, the request is routed to third-based preferred location.

In accordance with some embodiments, each scaling unit can publish its current load state to a central entity. In some embodiments, each scaling unit can poll the current load state of its neighbors. In some embodiments each server can publishes its current load state (e.g., every 30 seconds) to a central entity (e.g., ObjectStore or highly resilient key value repository). The server can check the load state more frequently (e.g., every second) and upload if a change in load state is detected respectively triggering the aggregate computation. The central entity can aggregate the published information and compute the current load state for the scaling unit. The incoming traffic can then be shed to the nearest location that is not identified as critically loaded by the central entity. In some embodiments, the flow may be as follows: 1) end-users make a DNS request for Office namespace; 2) the DNS request lands on a DNS server; and 3) DNS server makes a request to the central entity to identify which are the four closest scaling units that have not been identified as critically loaded. In some embodiments, the central entity can follow the following logic for this computation: 1) search for four scaling units that are not identified as critically loaded in order of datacenter proximity starting with current datacenter; 2) DNS server responds back to the end-user with four IP addresses belonging to four closest scaling units; and 3) end-user connects to one of the four IP addresses returned by the DNS server.

Various embodiments of the present technology provide for a wide range of technical effects, advantages, and/or improvements to computing systems and components. For example, various embodiments include one or more of the following technical effects, advantages, and/or improvements: 1) intelligent load shedding that sheds incoming traffic requests to scaling units based on the current resource utilization on the scaling units; 2) elastic assistance (e.g., seek load N levels deep only when required); 3) proactive and gradual load shedding (e.g., anticipate and proactively shed load making the load shedding gradual); 4) DDoS protection via near real-time computation of load in a central store; 5) protocol agnostic load-shedding design (e.g., coordinated and proportional load-shedding across protocols); 6) DNS reservations; 7) new techniques for traffic routing implementations that route traffic based on real-time prediction of anticipated load on scaling units based on actual historical DNS responses; 8) scaling units with small fault domains directing traffic to self-based on anycast DNS; 9) use of unconventional and non-routine operations to automatically route traffic; and/or 10) changing the manner in which a computing system reacts to the DNS requests.

Some embodiments include additional technical effects, advantages, and/or improvements to computing systems and components. In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to a large data centers and cloud computing systems with dynamic topologies, embodiments of the present technology are equally applicable to various other instantiations where system monitoring and traffic management services are needed (e.g., network configuration).

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

Figure 8:
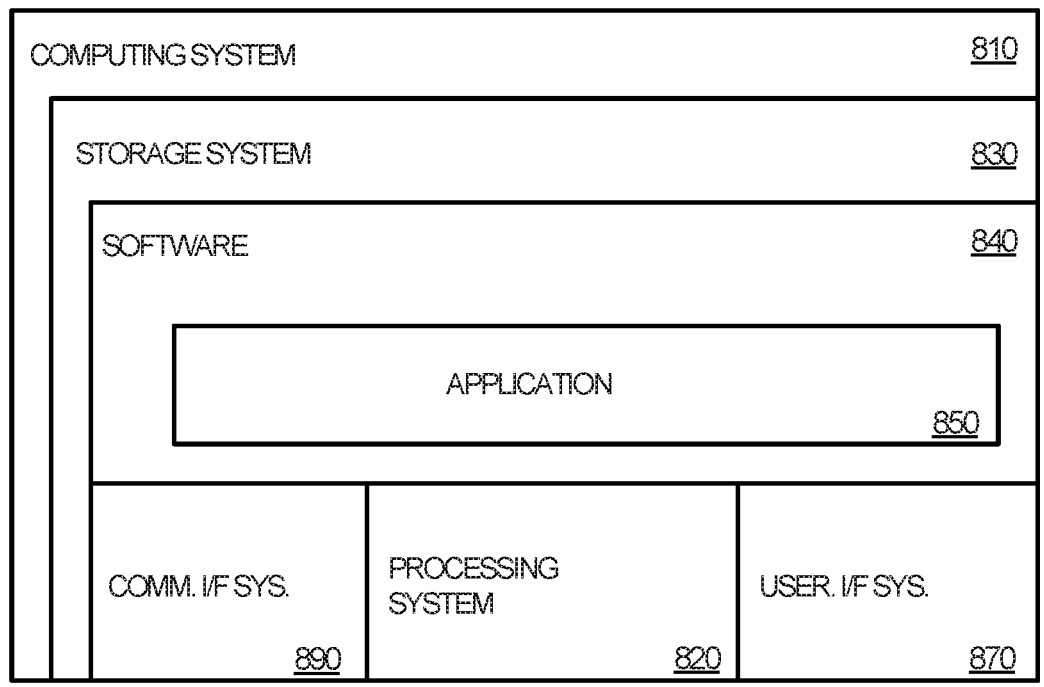
FIG. 8 illustrates an example of a computing system, which is representative of any system or collection of systems in which the various applications, services, scenarios, and processes disclosed herein may be implemented.

FIG. 1 illustrates an example of an environment 100 capable of implementing an intelligent load shedding system in accordance with some embodiments of the present technology. As illustrated in FIG. 1, environment 100 may include one or more computing devices 110A-110N, communications network 120, host servers 130A-130N, database 140A-140N, and central controller platform 150. Computing devices 110A-110N can be any computing system capable of running an application natively or in the context of a web browser, streaming an application, or executing an application in any other manner. Examples of computing system 110 include, but are not limited to, personal computers, mobile phones, tablet computers, desktop computers, laptop computers, wearable computing devices, thin client computing devices, virtual and/or augmented reality computing devices, virtual machine hosting a computing environment, distributed application, server computer, computing cluster, application hosted as software as a service (SaaS), application running on a platform as a service (PaaS), application running on an infrastructure as a service (IaaS) or any other form factor, including any combination of computers or variations thereof. One such representative architecture is illustrated in FIG. 8 with respect to computing system 810.

Those skilled in the art will appreciate that various components (not shown) may be included in computing devices 110A-110N to enable network communication with communications network 120. In some cases, communications network 120 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks.

As illustrated in FIG. 1, in some embodiments, a DNS server can be co-hosted with each of the host servers 130A-130N. In other embodiments, DNS server can live separately, but then will have an intelligent lookup to identify which is the preferred host server 130A-130N based on the information like LDNS IP extracted out of the DNS packet. In accordance with some embodiments, there may be one instance of Object Store/Central Controller per ring. For example, in some embodiments, a certain number of rings (e.g., three rings) may be deployed for world-wide capacity to maintain fault domains (e.g., to limit the blast radius).

Central controller 150 can receive, pull, and process status information about from various system components such as host servers 130A-130N, databases 140A-140N, utility grids, automatic transfer switches, uninterrupted power supplies, power distribution units, cooling equipment, backup generators, and other components. For example, central controller 150 may receive various signals such as processor utilization rates, wait times, response times, queue lengths, and the like. These signals can be used to create synthetic conditions that are based on a combination of two or more raw signals. Central controller 150 can use these signals and conditions to make load-shedding and routing decisions based on knowledge of load of the destination device. As such, instead of blindly throw a portion of incoming traffic to nearby locations, traffic can be routed from a location that needs assistance using intelligent routing based current load, resources, location, and/or other factors.

In accordance with various embodiments, location A can stretch and contract how many levels of locations it seeks assistance from based on the current traffic computation. In some embodiments, a location can go N level deep when searching for target locations to shed traffic to. As current load and assistance requirement is computed every few seconds across entire capacity boundary, this enables elastic load-shedding. A wave of incoming requests is served by seeking assistance multiple levels deep but requests after the wave has subsided can be served from Location A itself.

In some embodiments, a location can seek assistance from other nearby locations (e.g., chosen based on proximity defined by latency) proactively before the location enters a capacity crunch mode. If a location needs X underutilized scaling units to serve the current rate of incoming traffic, the location does not wait till there are less than X underutilized scaling units available before seeking assistance. Rather, the location can avoid entering crunch mode by seek assistance when less than (X+Y) underutilized scaling units are available. This behavior enforces slow gradual transition of net-new incoming traffic from being served exclusively from Location A to being served exclusively from Location B. Such techniques can also protect Location A from getting into a scenario wherein the location loses the functionality to serve traffic because of being overloaded.

Load-shedding features of various embodiments can be designed to be protocol agnostic. For example, in some embodiments, load-shedding can be conducted at the DNS layer which is agnostic to protocols consuming load state information like CPU, Disk, and Memory which are also agnostic to protocols stored on a central store which is also not protocol-specific. This ensures that shedding of HTTP and non-HTTP requests is coordinated and proportional.

In some embodiments, the DNS response of scaling unit X's IP address can be treated as a future reservation of its capacity. As such, rather than reacting to the current load characteristics of the system, various embodiments of the present technology can react to the anticipated future load characteristics of the system. A scaling unit would mark itself as overutilized not because it is currently under stress but because the scaling unit is expecting to be under stress based on the DNS responses that have been handed out.

In some embodiments, the central controller can utilize an ObjectStore table schema design. Some embodiments can model the capacity and load signal into ObjectStore using various combinations of tables. For example, some embodiments can use a DNS Partition Mapping table that can map a DNS server to its partition. The key can include the DNS server name having partition keys as the value. Some embodiments may use a Capacity Unit Info table that can aggregate signals from load, maintenance activity, and the like at a capacity unit level. The key for this table can include the partition key plus the capacity unit name to create a composite key. The values can include a list of constituent machine names, an activity state, a switch state, a load state, and/or a unicast external IP address (e.g. IPv4 address or IPv6 address). A Frontdoor Partition Ping Matrix can be used in some embodiments. This table can capture the cost between two frontdoor partition units. The key can include source partition plus the destination partition to create a composite key. Look ups in the Frontdoor Partition Ping Matrix can be made based on just source partition using range query and return a value corresponding to the cost.

Some embodiments may use a MachineLoad Info table that can save the load information at the scope of a machine. The key can be the machine name and the value can include server load and/or server load state. Various last update time stamp and various metrics may also available. Examples of the metrics include processor utilization, available memory, http requests per second, and/or DNS requests per second. A FrontdoorMapping table can cache the result of frontdoor mapping compute in some embodiments. The key can be the DNS server name and the values can include a list of frontdoor addresses, IPv4 addresses, and/or IpV6 addresses.

Figure 2:
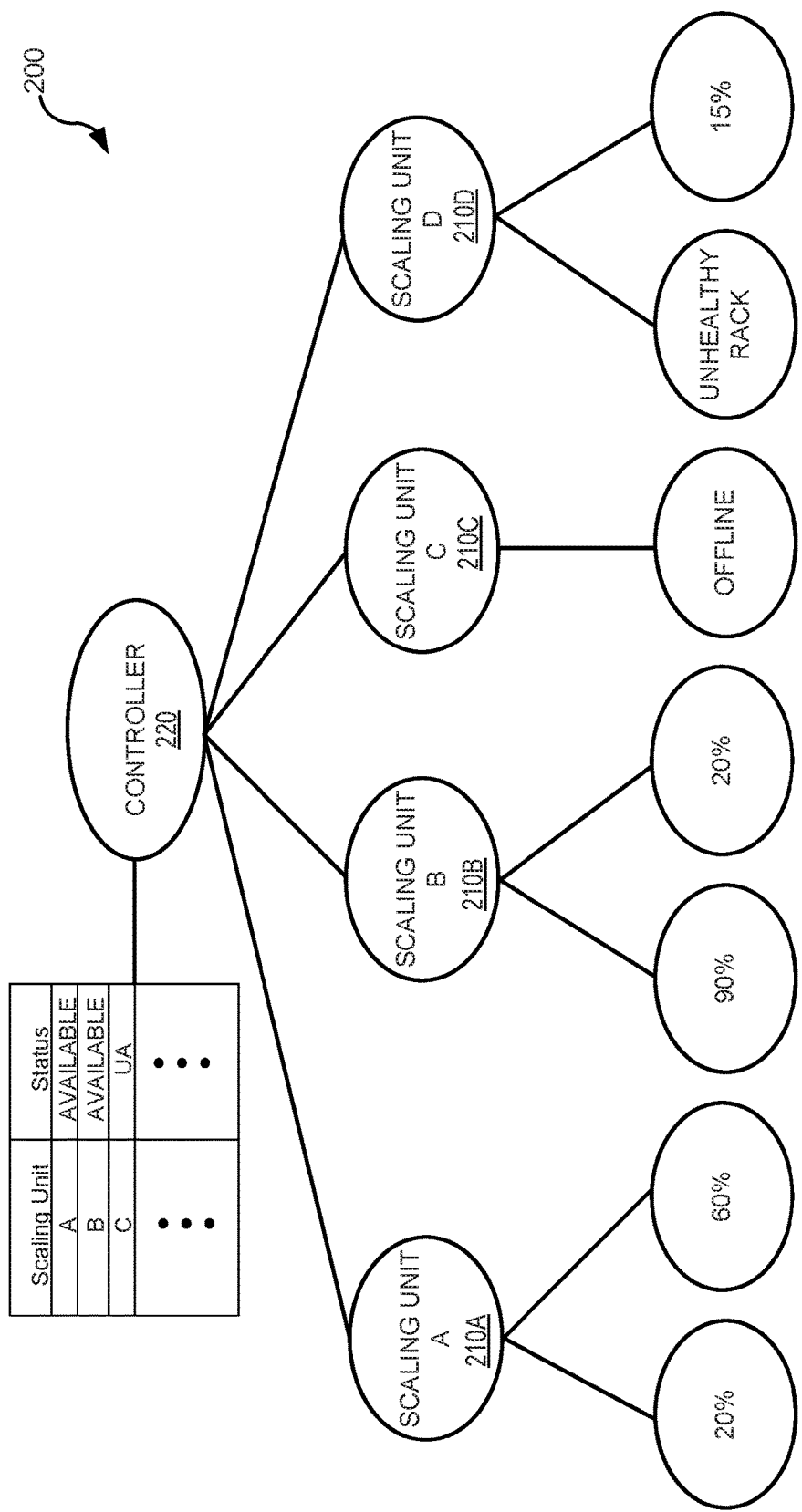
FIG. 2 illustrates an example of multiple scaling units reporting to a central controller according to one or more embodiments of the present technology.

FIG. 2 illustrates an example 200 of multiple scaling units 210A-210D reporting to a central controller 220 according to one or more embodiments of the present technology. Each scaling unit 210A-210D can identify the current status (e.g., health, utilization, capacity, etc.) of each rack. For example, as illustrated in FIG. 2, scaling unit A gets a report of 20% and 60% capacity, scaling unit B receives a report of 90% and 20% capacity, scaling unit C receives reports of the racks being offline, and scaling unit D receives a report of an unhealthy rack and a utilization of 15%. Each scaling unit can use this information to generate a current status (e.g., percent utilization, available capacity, tiered capacity levels, etc.) of the scaling unit's availability which is reported to the controller and published to the DNS server and other system components.

Based on the current resource utilization being reported to the controller, intelligent load shedding can be performed. As such, incoming traffic requests can be shed to scaling units based on the current resource utilization on the scaling units. Traditional proxies shed load when under pressure. However, majority of these implementations shed load from one big ring to another bigger ring with the assumption that the bigger ring has infinite capacity (i.e., more capacity than can be thrown at it). These traditional load-shedding techniques are blind and without knowledge of the current load characteristics of shedding target. In contrast, various embodiments of the present technology do not blindly throw portion of its incoming traffic to nearby location if a location needs assistance. Instead, various embodiments take into account current load and target location's current load. This can be done for every target location that a location needs assistance from and only the amount of traffic that the target locations can serve will be shed. This ensures that locations do not get blind-sided by unexpected load shed from some other location.

Some embodiments provide elastic assistance by seeking load N levels deep only when required. For example, location A can stretch and contract how many levels of locations to seek assistance from based on the current traffic computation. In some embodiments, a location can go N level deep when searching for target locations to shed traffic to. As current load and assistance requirement is computed (e.g., every few seconds) across entire capacity boundary, this enables elastic load-shedding. A wave of incoming requests can be served by seeking assistance multiple levels deep, but requests after the wave has subsided can be served from Location A itself.

Some embodiments provide for proactive and gradual load shedding (e.g., to anticipate and proactively shed load making the load shedding gradual). In some embodiments, a location can seek assistance from other nearby locations (chosen based on proximity defined by latency) proactively before the location enters capacity crunch mode. If a location needs X underutilized scaling units to serve the current rate of incoming traffic, the location does not wait till there are less than X underutilized scaling units available before seeking assistance. Rather, the location can avoid entering crunch mode by seek assistance when less than (X+Y) underutilized scaling units are available. This behavior enforces slow gradual transition of net-new incoming traffic from being served exclusively from Location A to being served exclusively from Location B. This behavior can also protect Location A from getting into a scenario where the functionality to serve traffic is lost because of being overloaded.

DDoS Protection via near real-time computation of load in a central store can be present in some embodiments. Some embodiments provide for near real-time computation (every few seconds with max staleness of 30 secs) of current availability and load for each scaling unit across the entire capacity boundary ensures that traffic is routed based on accurate and current load data. With a short time duration between incoming requests impacting load and subsequent requests being shed to other locations, some embodiments provide effective DDoS protection to each location (even the ones that do not have minimum required capacity).

Some embodiments provide for a protocol agnostic load-shedding design (e.g., coordinated and proportional load-shedding across protocols). Load-shedding features of various embodiments can be designed to be protocol agnostic. For example, in some embodiments, load-shedding can be conducted at the DNS layer which is agnostic to protocols consuming load state information like CPU, Disk, and Memory which are also agnostic to protocols stored on a central store which is also not protocol-specific. This ensures that shedding of HTTP and non-HTTP requests can be coordinated and proportional.

In some embodiments, the DNS response of scaling unit X's IP address can be treated as a future reservation of its capacity. As such, rather than reacting to the current load characteristics of the system, various embodiments can react to the anticipated future load characteristics of the system. A scaling unit could mark itself as overutilized not because the scaling unit 210A-210D is currently under stress but because the scaling unit 210A-210D is expecting to be under stress based on the DNS responses that have been handed out. In some embodiments, traffic can drive load and load can drive future traffic to be shed/not shed. Some embodiments can use a DNS reservation design. As such, in some embodiments DNS requests can drive reservation of capacity which can drive traffic to be shed/not shed.

Some embodiments provide for traffic routing implementations that route traffic based on real-time prediction of anticipated load on scaling units based on actual historical DNS responses. Scaling units 210A-210D with small fault domains can direct traffic to itself based on an anycast DNS in some embodiments. Various embodiments can leverage anycast TCP or central store/brain. As a result, a small set of resources can identify if additional traffic should be routed to a scaling unit by simply withdrawing/publishing its IP address on an anycast DNS ring.

Figure 3:
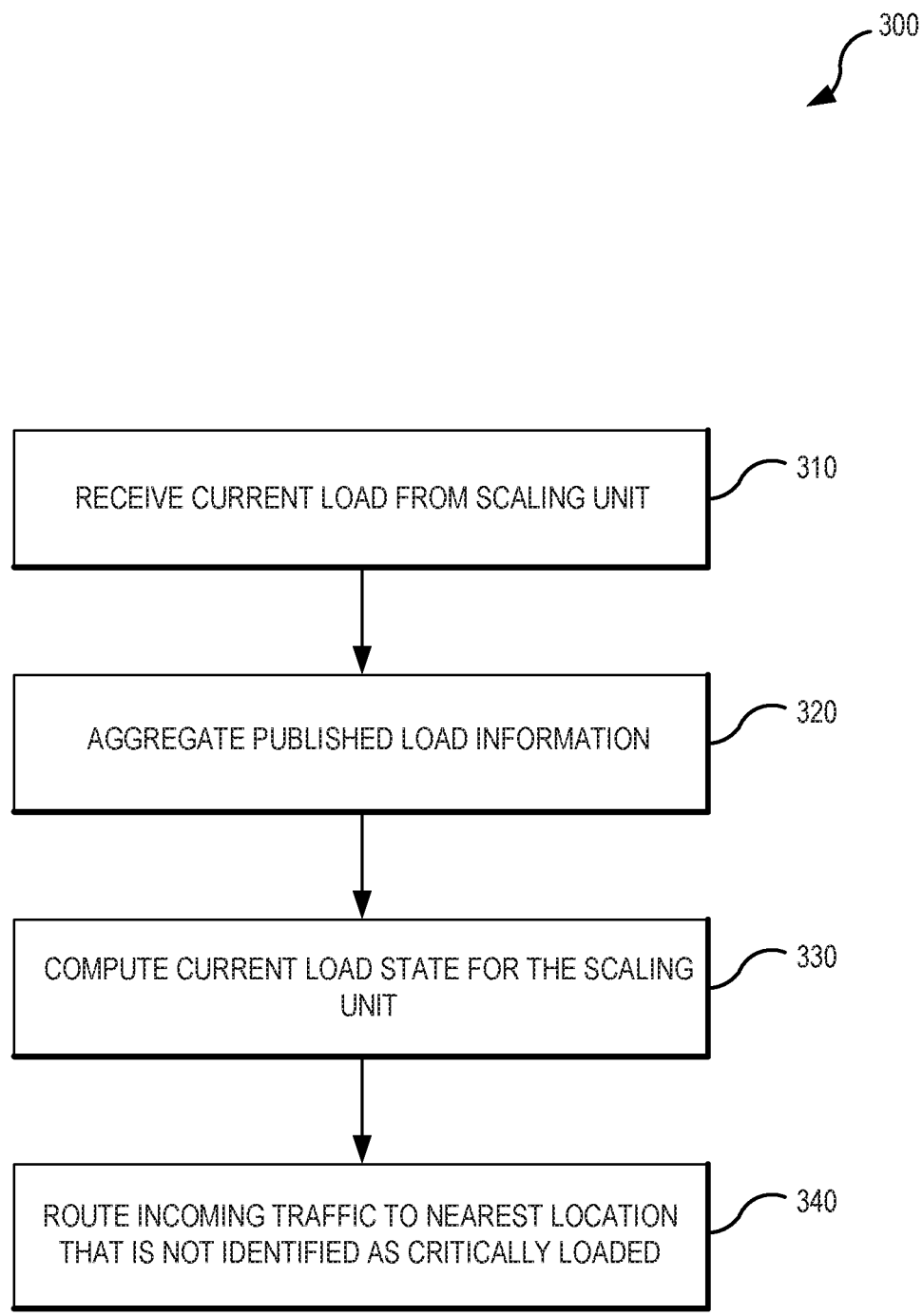
FIG. 3 illustrates an example of a set of operations for routing incoming traffic that may be used in one or more embodiments of the present technology.

FIG. 3 illustrates an example of a set of operations 300 for routing incoming traffic that may be used in one or more embodiments of the present technology. During receiving operation 310, current load information can be received from one or more scaling units. For example, in accordance with various embodiments, the load information can include load characteristics and/or available resources. Aggregation operation 320 can aggregate the current load information received with other load information published by components within the scaling unit. The aggregated load information can then be used to compute a current load state for the scaling unit during computation operation 330. Routing operation 340, can route any incoming traffic to the nearest location that is not identified as critically loaded. For example, in some embodiments, routing operation 340 can route incoming traffic based on current load state of the target capacity. The requests can be routed to location that is not identified as critically loaded (e.g., in order of preference). If the first-preferred location is identified as loaded, then the requests are routed to second-preferred location. If the second-preferred location is also identified as critically loaded, the request is routed to third-based preferred location.

Figure 4:
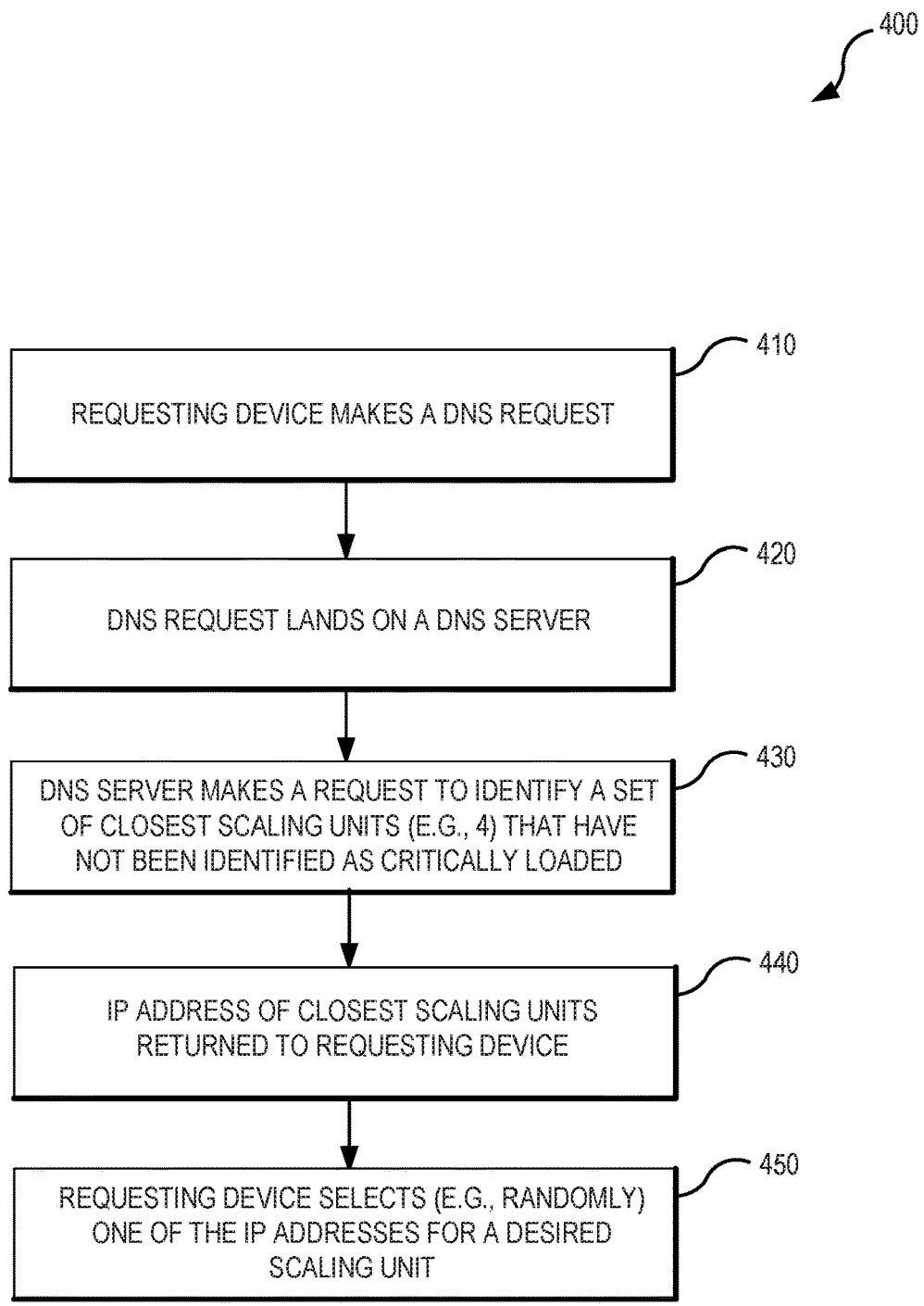
FIG. 4 illustrates an example of a set of operations for a processing a DNS request that may be used in one or more embodiments of the present technology.

FIG. 4 illustrates an example of a set of operations 400 for processing a DNS request that may be used in one or more embodiments of the present technology. As illustrated in FIG. 4, during requesting operation 410 a requesting device submits a DNS request (e.g., a request to translate a hostname of a domain to an IP address). During operation 420, the DNS request lands at a DNS server that identifies, during identification operation 430, a set of IP addresses (e.g., four or more IP addresses) of scaling units hosting the target that are not currently being addressed as critically loaded. For example, the original DNS request may be routed to a DNS server that is closest (e.g., geographically, logically, etc.) to the submitting device. The DNS server, during identification operation 430, may attempt or prefer to return the closest scaling units. However, the scaling units that may be closer may be identified as being critically loaded, unavailable, likely to deny requests, etc. These scaling units can be excluded and the IP addresses of the next closest scaling units can be returned to the requesting device during reply operation 440.

During selection operation 450, the requesting device can select one of the IP addresses returned from the DNS server. In some embodiments, the reply from the DNS server may also specify location, load, system utilization (e.g., current and/or historical), and/or other characteristics about the servers or scaling units. The requesting device can use these characteristics during selection operation 450 (e.g., by picking the least utilized), may select one of the IP addresses and route the traffic to the selected target. In some embodiments, the IP addresses may include an expiration time and/or date (e.g., within five minutes, ten minutes, etc.). As such, selection operation 450 may remove any IP addresses that have expired from the list of available IP addresses and/or submit a subsequent DNS request.

Figure 5:
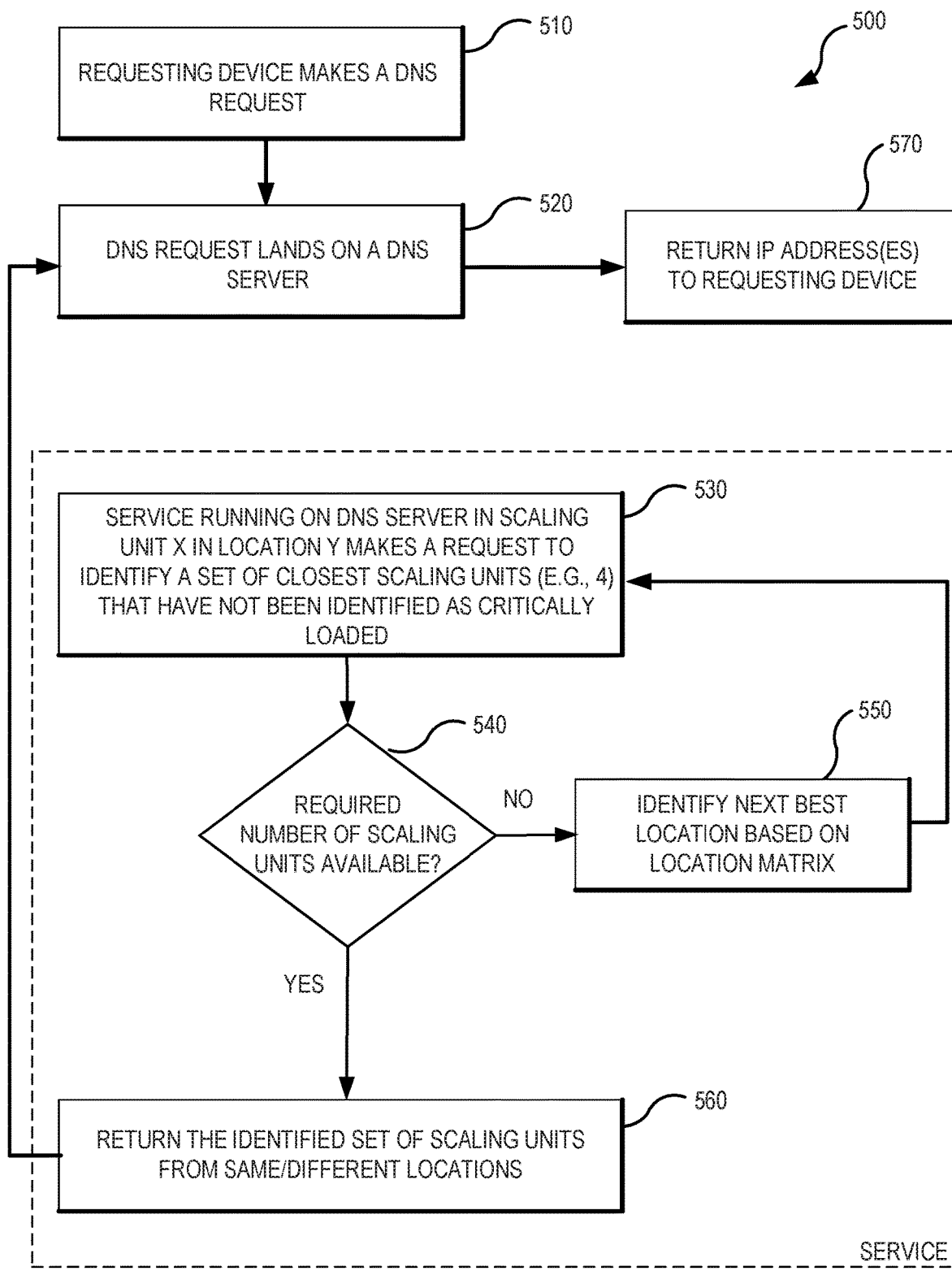
FIG. 5 illustrates an example of set of operations for processing a DNS request that may be used in various embodiments of the present technology.

FIG. 5 illustrates an example of set of operations 500 for processing a DNS request that may be used in various embodiments of the present technology. As illustrated in FIG. 5, requesting operation 510 can receive a DNS request from a requesting device that has submitted a DNS request (e.g., a request to translate a hostname of a domain to an IP address). During operation 520, the DNS request lands at a DNS server. The DNS server can be consistently updated (e.g., via an availability service) with information regarding the availability of various scaling units.

During identification operation 530, the service running on the DNS server in scaling unit X in location Y can make a request to identify a set of closest scaling units (e.g., 2, 4, 5, 6, etc.) that have not been identified as critically loaded. Determination operation 540 can determine if the number of scaling units available meets a threshold or required amount. When determination operation 540 determines that the needed number of scaling units are not available, then determination operation 540 branches to indexing operation 550 which identifies the next best location (e.g., using a location matrix) and requests that identification operation 530 identify scaling units in the new location.

When determination operation 540 determines that the needed number of scaling units are available, then determination operation 540 branches to return operation 560 which returns the identified set of scaling units from the same/ different locations to the DNS server. For example, the original DNS request may be routed to a DNS server that is closest (e.g., geographically, logically, etc.) to the submitting device. The DNS service may attempt (or prefer) to return the closest scaling units (e.g., from the same ring). However, the scaling units that may be closer may be identified as being critically loaded, unavailable, likely to deny requests, etc. These scaling units can be excluded and the IP addresses of the next closest scaling units can be identified. The DNS server then uses this set of scaling units to return on or more corresponding IP addresses to the requesting device.

Figure 6:
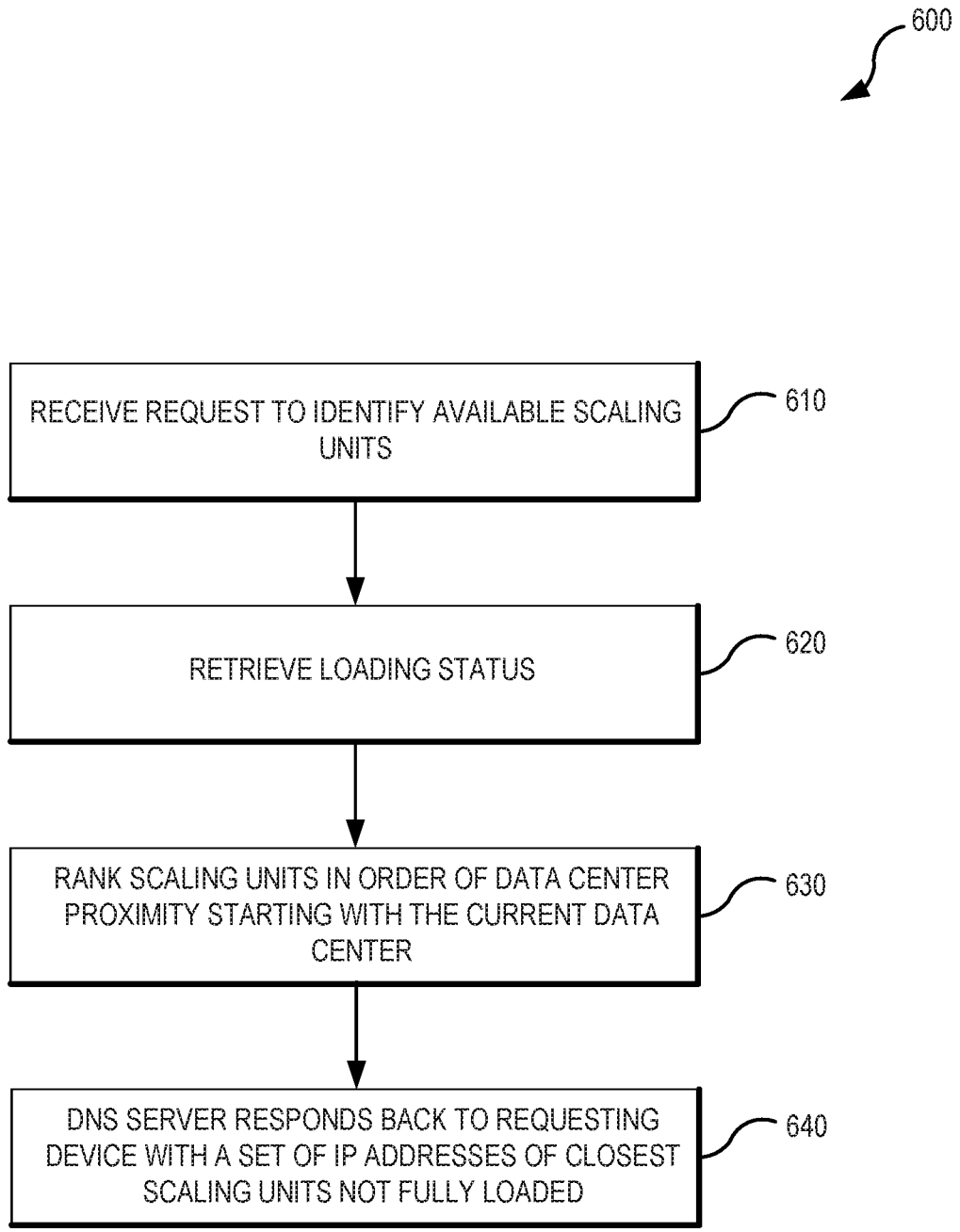
FIG. 6 illustrates an example of a set of operations for determining a set of IP addresses associated with scaling units according to one or more embodiments of the present technology.

FIG. 6 illustrates an example of a set of operations 600 for determining a set of IP addresses associated with scaling units according to one or more embodiments of the present technology. As illustrated in FIG. 6, during receiving operation 610, a request to identify available scaling units can be received. Retrieval operation 620 can retrieve the loading status of each of the scaling units. This may be done, in some embodiments, by actively pinging each scaling unit or retrieving a datastore with loading information that is updated as scaling units periodically provide updates.

Ranking operation 630 order the data centers with sufficient capacity in proximity with the current data center. Response operation 640 can generate a response back, from the DNS server, to the requesting device with a set of IP address of closest scaling unites that are not fully loaded. In some embodiments, the DNS server health and additional server health can be decoupled (e.g., in each rack, DNS servers need not be retracted as the other servers get loaded with client TCP request.) Each DNS query can be given smarter response taking into view the load situation of the racks in its proximity. Better surge absorption strategy by making sure there is a minimum number of capacity being returned in the DNS response.

Figure 7:
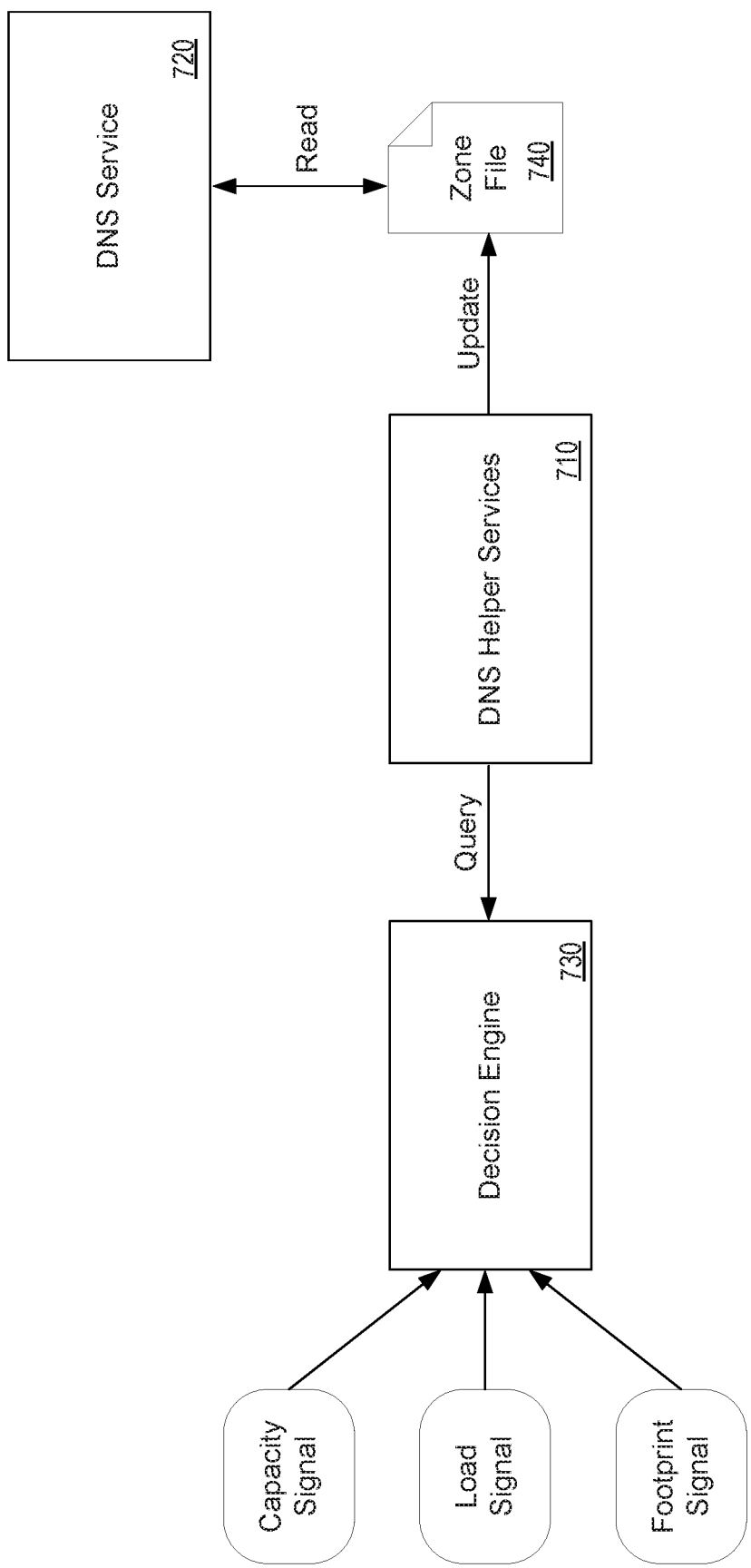
FIG. 7 illustrates an example of a DNS helper service that may be used in some embodiments of the present technology.

FIG. 7 illustrates an example of a DNS helper service 700 that may be used in some embodiments of the present technology. A DNS helper service 710 can be a microservice running on the same server as the DNS service 720. At periodic intervals, which is configurable, this helper service can 1) query the decision engine 730 for the list of racks that need to be handed out in DNS response for the DNS queries landing on the specific server; and 2) for each rack, an 'A record' with outlook and the unicast IP corresponding to the rack into the dedicated zone using DNS client libraries can be added to zone file 740. The DNS helper service 710 can be hosted within a windows service in some embodiments. Every decision engine query and update to the DNS zone on the box can be logged to a log file for troubleshooting purposes.

In some embodiments, an extensible decision engine may have a single responsibility that is to compute, at any given point in time, the right set of highly available IP addresses corresponding to racks that can serve the end user request with lowest latency, while maximizing capacity utilization. Decision engine 730 itself can be designed as a library that the DNS helper service 710 can invoke. The library can later transform into a much-evolved independent service. The library can expose an API for the DNS helper service 710 to call into.

In some embodiments, the input parameters can include a DNS Server Name (e.g., dnsServerName) that provides context of the datacenter on which the user's DNS request is landing. The landing DNS server can be used as an approximation to user's location. The input parameters may also include a Rack Count (e.g., countOfRacks) representing the number of racks to be returned in response. The output parameters can include the list of unicast IP addresses corresponding to be handed out in response to the DNS query. Decision engine 730 can use various signals to decide the capacity optimal for the client request. These signals include but are not restricted to the following: capacity/ topology information, load information (e.g., CPU, memory, RPS), DNS response audit for factoring in DNS reservation, health information (e.g., availability, latency, etc.), and/or client signals from footprint.

In some embodiments, every individual front end server can share load signals that the decision engine can use to see if more traffic can be routed to the given capacity (rack) or not. The signals that are shared can include processor, memory, abstracted load state, and the like. Though the load signal can be captured at a per machine level in some embodiments, given that the load balancer of the rack does a round-robin of requests among all the available servers, for traffic management perspective the unit at which traffic flow is controlled (on/off) is the rack. In order to aggregate the load signal across machines in a rack, some embodiments may use the following technique—A rack is considered loaded if more than a threshold percentage (e.g., 50%) of the machines are either not in service or are loaded to a critical load state.

Some embodiments can upload information about the capacity entering the service. The information can include the following: capacity unit name, list of constituent machines, unicast external IP address of the rack, switch state, and/or activity state. Some embodiments can include a periodic service that can collect topology information and upload the same. Rack maintenance workflow can update the switch state in this data store appropriately. This information can be used for capacity discovery and to decide if a certain rack is 'fit' to be in service from a maintenance perspective. Only racks with a "SwitchState" as active may be considered as eligible capacity in some embodiments. The signals fed into decision engine 730 can be managed in a way that the information is current and can be efficiently queried.

Some embodiments may use peer poling where the signal is not stored/cached. In other embodiments, each machine can perform the following: 1) capacity discovery to discover other racks in the vicinity (or within the FE partition); and 2) a live periodic query (pull) for the current load state across each of the racks with in an appropriate scope. In some embodiments, each rack can have a new monitoring vIP, that encapsulates the state of that rack with respect to taking TCP traffic through ACDC. This monitoring vIP can be turned on or off based on a load probe running on a load balancer. The load probe can periodically query the load.htm on all servers in the rack that are not 'out of service'. The monitoring vIP can stay on until more than 50% of live servers in the rack are not loaded.

Unfortunately, getting the list of all capacity unit in a front-end partition unit from within the capacity servers is not easy. To work around this issue, some embodiments use a new DNS zone, <FE_Partition>.prod.domain.com with the IPs of all racks in the front-end partition in it. A background process running in each of the servers as the DNS server can periodically poll the monitoring vIPs corresponding to IP addresses in the <FE_Partition>.prod.domain.com zone entry and select K racks that are up based on a hash.

Some embodiments can use a persisted cache storage. In some of these embodiments, the load signal can be stored within the persistent shared cache in café. Within this option, various embodiments can take one of the following two approaches: 1) a master-slave model; or 2) a peer-to-peer model. In the master slave model, used by various embodiments, at each given point in time one of the servers in the rack can be designated to be the master. This master server can query other rack in front end partition for health info and broadcast the same to other machines within the rack. This pattern introduces additional complexity in managing the master. In the peer-to-peer model used by some embodiments, every server in the rack can poll every other rack in the front-end partition for health information. Though this model does not reduce the number of health query calls made across within a front-end partition, this model does help in converging the health view across a given rack.

FIG. 8 illustrates computing system 810, which is representative of any system or collection of systems in which the various applications, services, scenarios, and processes disclosed herein may be implemented. For example, computing system 810 may include server computers, blade servers, rack servers, and any other type of computing system (or collection thereof) suitable for carrying out the enhanced collaboration operations described herein. Such systems may employ one or more virtual machines, containers, or any other type of virtual computing resource in the context of supporting enhanced group collaboration.

Computing system 810 may be implemented as a single apparatus, system, or device or may be implemented in a distributed manner as multiple apparatuses, systems, or devices. Computing system 810 includes, but is not limited to, processing system 820, storage system 830, software 840, applications for process 850, communication interface system 860, and user interface system 870. Processing system 820 is operatively coupled with storage system 830, communication interface system 860, and an optional user interface system 870.

Processing system 820 loads and executes software 840 from storage system 830. When executed by processing system 820 for deployment of scope-based certificates in multi-tenant cloud-based content and collaboration environments, software 840 directs processing system 820 to operate as described herein for at least the various processes, operational scenarios, and sequences discussed in the foregoing implementations. Computing system 810 may optionally include additional devices, features, or functionality not discussed for purposes of brevity.

Referring still to FIG. 8, processing system 820 may comprise a micro-processor and other circuitry that retrieves and executes software 840 from storage system 830. Processing system 820 may be implemented within a single processing device, but may also be distributed across multiple processing devices or sub-systems that cooperate in executing program instructions. Examples of processing system 820 include general purpose central processing units, application specific processors, and logic devices, as well as any other type of processing device, combinations, or variations thereof.

Storage system 830 may comprise any computer readable storage media readable by processing system 820 and capable of storing software 840. Storage system 830 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 830 may also include computer readable communication media over which at least some of software 840 may be communicated internally or externally. Storage system 830 may be implemented as a single storage device, but may also be implemented across multiple storage devices or sub-systems co-located or distributed relative to each other. Storage system 830 may comprise additional elements, such as a controller, capable of communicating with processing system 820 or possibly other systems.

Software 840 may be implemented in program instructions and among other functions may, when executed by processing system 820, direct processing system 820 to operate as described with respect to the various operational scenarios, sequences, and processes illustrated herein. For example, software 840 may include program instructions for directing the system to perform the processes described above.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 840 may include additional processes, programs, or components, such as operating system software, virtual machine software, or application software. Software 840 may also comprise firmware or some other form of machine-readable processing instructions executable by processing system 820.

In general, software 840 may, when loaded into processing system 820 and executed, transform a suitable apparatus, system, or device (of which computing system 810 is representative) overall from a general-purpose computing system into a special-purpose computing system. Indeed, encoding software on storage system 830 may transform the physical structure of storage system 830. The specific transformation of the physical structure may depend on various factors in different implementations of this description. Examples of such factors may include, but are not limited to, the technology used to implement the storage media of storage system 830 and whether the computer-storage media are characterized as primary or secondary storage, as well as other factors.

For example, if the computer readable storage media are implemented as semiconductor-based memory, software 840 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

In general, process 850 can be hosted in the cloud as a service, distributed across computing devices between the various endpoints, hosted as a feature of a cloud enabled information creation and editing solution. Communication interface system 860 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 870 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 870. In some cases, the input and output devices may be combined in a single device, such as a display capable of displaying images and receiving touch gestures. The aforementioned user input and output devices are well known in the art and need not be discussed at length here. In some cases, the user interface system 870 may be omitted when the computing system 810 is implemented as one or more server computers such as, for example, blade servers, rack servers, or any other type of computing server system (or collection thereof).

User interface system 870 may also include associated user interface software executable by processing system 820 in support of the various user input and output devices discussed above. Separately or in conjunction with each other and other hardware and software elements, the user interface software and user interface devices may support a graphical user interface, a natural user interface, an artificial intelligence agent (e.g. an enhanced version of Microsoft's Cortana assistant, Amazon's Alexa, or Apple's Siri, Google's Assistant, etc.), or any other type of user interface, in which a user interface to a productivity application may be presented.

Communication between computing system 810 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. In any of the aforementioned examples in which data, content, or any other type of information is exchanged, the exchange of information may occur in accordance with any of a variety of well-known data transfer protocols.

The functional block diagrams, operational scenarios and sequences, and flow diagrams provided in the figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method for operating a domain name system (DNS) server, the method comprising:
   computing, based at least on aggregating multiple rack level status indicators, a status of each of multiple scaling units mapped to a domain name, wherein the multiple rack level status indicators identify a rack as loaded when more than a threshold percentage of associated machines are either not in service or are loaded to a critical load state; and
   responsive to a domain name resolution request from a requesting device:
      determining, based at least on a comparison of the status of each of the multiple scaling units to historical responses, an availability status of each of the multiple scaling units; and
      identifying, based at least on the comparison, a set of Internet protocol (IP) addresses corresponding to a subset of the multiple scaling units closest to the requesting device with availability statuses indicating available for new traffic.

2. The method of claim 1, wherein the status of each of the multiple scaling units comprises at least one of scaling unit health, scaling unit utilization, scaling unit capacity, scaling unit resource utilization, scaling unit processor utilization rates, scaling unit wait times, scaling unit response times, and scaling unit queue lengths.

3. The method of claim 1, further comprising:
   estimating, based on a location of the DNS server, an approximate location of the requesting device; and
   wherein the approximate location of the requesting device is used in identifying the set of IP addresses.

4. The method of claim 1,
   further comprising sending a response to the requesting device including the set of IP addresses.

5. The method of claim 1, further comprising:
   computing the status on a periodic schedule; and
   recording the status within an object store.

6. The method of claim 1, wherein computing the status of each of the multiple scaling units is further based on an anticipated future load characteristic.

7. The method of claim 1, wherein the requesting device iteratively selects and attempts to connect to one of the IP addresses from the set of IP addresses until a successful connection is made.

8. A system comprising:
   a decision engine configured to monitor status indicators from scaling units,
      wherein the status indicators from the scaling units are computed based, at least in part, on aggregating status indicators from rack levels, and
      wherein the status indicators from the rack levels identify a rack as loaded when more than a threshold percentage of associated machines are either not in service or are loaded to a critical load state;
   a domain name system (DNS) helper server configured to query the decision engine for a list of racks to be included in a DNS response to a DNS query landing on a server, wherein the list of racks is determined based, at least in part, on a comparison of the status indicators from the scaling units to historical responses, and wherein the list of racks is added to a record within a zone file; and
   a DNS service configured to receive a DNS request from a device and retrieve, by accessing the zone file, the list of racks to be included in a DNS response to the DNS query.

9. The system of claim 8, wherein the record within the zone file includes, corresponding to each rack identified in the list of racks, an anticipated future load characteristic and unicast IP address.

10. The system of claim 9, wherein the device randomly selects the unicast IP address corresponding to a rack in the list of racks.

11. The system of claim 9, wherein the decision engine orders the list of racks based on the anticipated future load characteristic of each rack.

12. The system of claim 8, wherein the list of racks identified by the decision engine correspond to racks having a lowest latency.

13. The system of claim 8, further comprising a topology service to collect topology information of a data center.

14. A non-transitory computer-readable storage medium containing a set of instructions to cause one or more processors to:
   compute, based at least on aggregating multiple rack level status indicators, a status of multiple scaling units within a data center, wherein the multiple rack level status indicators identify a rack as loaded when more than a threshold percentage of associated machines are either not in service or are loaded to a critical load state; and
   responsive to a domain name resolution request from a requesting device:
   determine, based at least on a comparison of the status of each of the multiple scaling units to historical responses, an availability status of each of the multiple scaling units; and
   identify, based at least on the comparison, multiple Internet protocol (IP) addresses to be included in a response to the domain name resolution request,
      wherein the multiple IP addresses only include IP addresses of a subset of the multiple scaling units with an availability status indicative of available capacity.

15. The computer-readable storage medium of claim 14, wherein the set of instructions further cause the one or more processors to generate an estimated location of the requesting device based on a location of the data center, and wherein the IP addresses in the multiple IP addresses are ordered based on proximity to the estimated location of the requesting device.

16. The computer-readable storage medium of claim 14, wherein each status includes an indication of scaling unit health, scaling unit utilization, scaling unit capacity, scaling unit resource utilization, scaling unit processor utilization rates, scaling unit wait times, scaling unit response times, or scaling unit queue lengths.

17. The computer-readable storage medium of claim 14, wherein computing the status of each of the multiple scaling units is further based on an anticipated future load characteristic.

18. The computer-readable storage medium of claim 14, wherein the set of instructions further cause the one or more processors to identify a topology of the data center.

19. The computer-readable storage medium of claim 14, wherein the set of instructions further cause the one or more processors to compute the status of the multiple scaling units further based on polling each of the multiple scaling units.

20. The computer-readable storage medium of claim 14, wherein the set of instructions further cause the one or more processors to
send the multiple IP addresses to the requesting device.

\* \* \* \* \*